US011034456B2

(12) United States Patent
Bermudez et al.

(10) Patent No.: US 11,034,456 B2
(45) Date of Patent: Jun. 15, 2021

(54) FUSELAGE AND AIRCRAFT INCLUDING AN AIR DISTRIBUTION MULTIFUNCTIONAL SUBSTRUCTURE AND ASSEMBLY METHOD

(71) Applicant: Airbus SAS, Blagnac (FR)

(72) Inventors: Michel Bermudez, Suresnes (FR); Bruno Thomas, Paris (FR); Jean-Mathieu Guimard, Vieille Eglise en Yvelines (FR)

(73) Assignee: AIRBUS SAS, Blagnac (FR)

( * ) Notice: Subject to any disclaimer, the term of this patent is extended or adjusted under 35 U.S.C. 154(b) by 272 days.

(21) Appl. No.: 16/026,239

(22) Filed: Jul. 3, 2018

(65) Prior Publication Data
US 2019/0016464 A1 Jan. 17, 2019

(30) Foreign Application Priority Data
Jul. 11, 2017 (FR) ...................................... 1756554

(51) Int. Cl.
*B64D 13/00* (2006.01)
*F24F 13/02* (2006.01)
(Continued)

(52) U.S. Cl.
CPC .............. *B64D 13/06* (2013.01); *B64C 1/00* (2013.01); *B64C 1/061* (2013.01); *B64C 1/068* (2013.01);
(Continued)

(58) Field of Classification Search
CPC ........ B64D 13/00; B64C 1/18; F24F 13/0227; F24F 2221/40
See application file for complete search history.

(56) References Cited

U.S. PATENT DOCUMENTS

| | | | | |
|---|---|---|---|---|
| 3,331,169 A | * | 7/1967 | Cumming | ................. E04B 5/48 52/220.4 |
| 8,096,503 B2 | * | 1/2012 | Verweyen | ............... B64C 1/067 244/117 R |
| 8,366,042 B2 | * | 2/2013 | Haselmeier | ............... B64C 1/18 244/119 |
| 8,814,091 B2 | * | 8/2014 | Zorzetto | ................ B61D 17/10 244/119 |

(Continued)

FOREIGN PATENT DOCUMENTS

| | | |
|---|---|---|
| DE | 102007036763 | 2/2009 |
| FR | 0958371 | 5/2011 |

(Continued)

OTHER PUBLICATIONS

French Search Report, dated Dec. 16, 2017, priority document.

*Primary Examiner* — Brian M O'Hara
(74) *Attorney, Agent, or Firm* — Greer, Burns & Crain, Ltd.

(57) ABSTRACT

An aircraft fuselage including a fuselage skin, cross-members supporting a floor of the aircraft, wherein the fuselage includes a multifunctional substructure fixed to at least one of the cross-members in a lowered part of the cross-member. The multifunctional substructure comprises: at least one duct of an air distribution system having a substantially rectangular section at the location of the at least one cross-member and having lateral walls of the duct that are substantially vertical; a seat fixing track or a stiffener fixed on a first lateral wall of the duct of the multifunctional substructure, and; a seat fixing track or a stiffener fixed on a second lateral wall, opposite the first lateral wall, of the duct of the multifunctional substructure.

13 Claims, 3 Drawing Sheets

(51) Int. Cl.
  *B64D 13/06* (2006.01)
  *B64C 1/06* (2006.01)
  *B64C 1/12* (2006.01)
  *B64C 1/20* (2006.01)
  *B64C 1/00* (2006.01)
  *B64C 1/18* (2006.01)
  *B64D 11/00* (2006.01)

(52) U.S. Cl.
  CPC ............ *B64C 1/12* (2013.01); *B64C 1/18* (2013.01); *B64C 1/20* (2013.01); *B64D 13/00* (2013.01); *F24F 13/0227* (2013.01); *B64C 2001/0072* (2013.01); *B64C 2001/0081* (2013.01); *B64D 2011/0046* (2013.01); *B64D 2221/00* (2013.01); *F24F 13/0245* (2013.01); *F24F 13/0254* (2013.01); *F24F 2221/40* (2013.01)

(56) References Cited

U.S. PATENT DOCUMENTS

| | | |
|---|---|---|
| 9,284,036 B2 | 3/2016 | Kook |
| 10,549,859 B2* | 2/2020 | Movsesian ............ B64C 1/20 |
| 2008/0210820 A1 | 9/2008 | Kismarton et al. |
| 2010/0031509 A1 | 2/2010 | Frauen et al. |
| 2013/0009007 A1 | 1/2013 | Tomasi et al. |
| 2014/0094103 A1* | 4/2014 | Dreyhaupt ......... B64D 11/0023 454/76 |
| 2017/0328497 A1 | 11/2017 | Dantin |
| 2018/0362138 A1* | 12/2018 | Gross ................. B29C 65/02 |

FOREIGN PATENT DOCUMENTS

| | | |
|---|---|---|
| WO | 2007057411 | 5/2007 |
| WO | 2016079226 | 5/2016 |

* cited by examiner

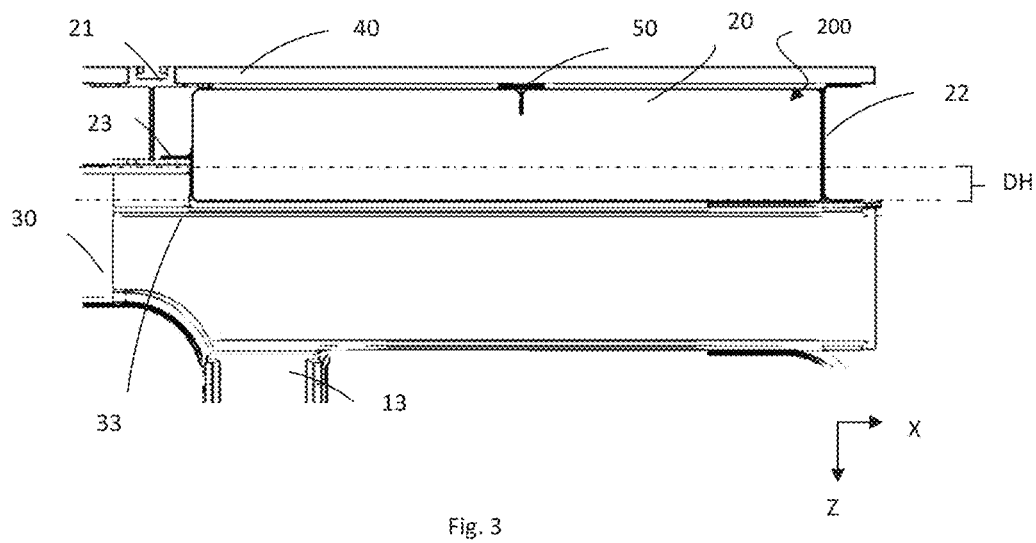
Fig. 3
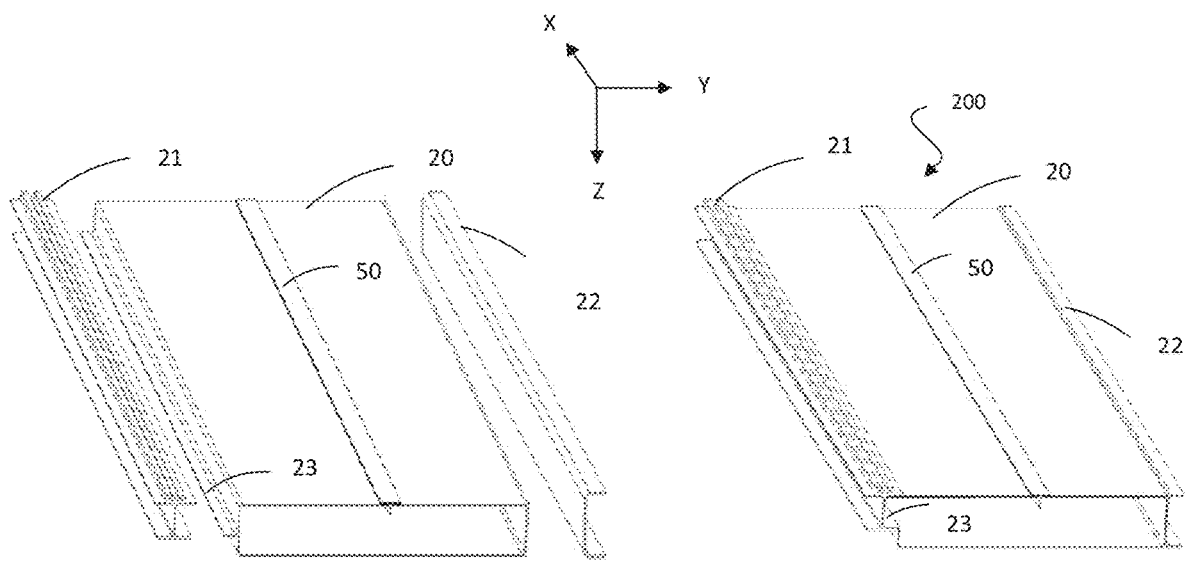
Fig. 4a
Fig. 4b

FUSELAGE AND AIRCRAFT INCLUDING AN AIR DISTRIBUTION MULTIFUNCTIONAL SUBSTRUCTURE AND ASSEMBLY METHOD

CROSS-REFERENCES TO RELATED APPLICATIONS

This application claims the benefit of the French patent application No. 1756554 filed on Jul. 11, 2017, the entire disclosures of which are incorporated herein by way of reference.

BACKGROUND OF THE INVENTION

The present invention pertains to the field of engineering of aircraft fuselage structures. In particular, the invention relates to a fuselage and an aircraft including a multifunctional substructure comprising a duct of an air distribution system combined with cabin floor support structures of the fuselage and/or with seat fixing tracks.

In aircraft, in particular in airplanes, the structure of a passenger floor is supported by link rods placed between the cross-members and the frames of the fuselage. These link rods define a substantially triangular section zone which is formed between the passenger floor, the frame of the fuselage and the floor rods. The volume of space available in this so-called "triangle" zone is quite small and difficult to access but it is nevertheless used for arranging multiple components and systems necessary for the operation of the aircraft without affecting the aesthetics of the passenger cabin or cluttering the hold.

Typically found arranged in the "triangle" zone are components such as pipes for the air-conditioning system air, electricity network bundles, water ducts, extinguishers, etc. The reduced volume available, and the requirement for arranging so many elements poses several problems, particularly during the installation of these components (in the context of increasing production rates) and during the maintenance operations.

The installation of the various systems in the fuselage structure requires the individual assembly of the various components of the systems typically providing a single system function. For example, the cabin air in the aircraft is generally distributed by rigid piping made from a composite of glass fibers and phenolic resin, which piping is interconnected by connecting sleeves. This piping with relatively large sections has an extremely light and fragile structure, which makes the fitting thereof particularly tricky and costly in terms of installation time.

Carrying out maintenance or repair operations in the triangle zone proves to be difficult due to the reduced space remaining available for a person to access and operate in this zone. These operations therefore become long and costly, as well as tedious for the persons carrying them out. Thus, acting upon particularly fragile and voluminous air-conditioning pipes is tricky and, moreover, this large piping makes the installation and the access of the other systems and the maintainability thereof in the triangle zone more difficult.

The structure of the triangle zone of an aircraft is illustrated in FIG. 1 showing a partial view of a fuselage as an isometric view, the structure of which corresponds to the typical structure of the fuselages of the aircraft that are currently in service. The structure of the fuselage is presented in a simplified manner and shows the frames 10, the fuselage skin 12 and the strengthening rods 13 supporting the cross-members 11 supporting the floor (not illustrated). In this structure, a circular section air-conditioning duct 15 is arranged inside the so-called "triangle" zone, formed between the frames 10 and the fuselage skin 12, the strengthening rods 13 and the cross-members 11. The other systems are not shown in this case.

Today, one of the objectives in the design of new fuselages is that they can be assembled in a reduced time respecting the increased rates and in a simplified manner, while allowing optimization of the occupied volume and of the total mass of the structure. It is this context that gave rise to the idea of using multifunctional substructures in the design of an aircraft making it possible to reduce the total number of individual components to be installed in the structure of the fuselage.

The international application WO2016/079226 describes a duct for forming air circulation channels in a structure which can fix electrical conductors. The patent FR 0958371 describes a composite material structural element, for example a fuselage or a floor, that can transport an electrical power.

However, in these solutions, the only advantage obtained is the combination of the electrical functions with air piping without improving the problem of installing this piping which is all the more complex due to the problems of electrical connections.

If these solutions make it possible to reduce the number of components for installing a determined system in an aircraft, the installation and the arrangement of the components in the fuselage do not offer significant advantages with regard to the volume gains and the ease of the operations for installing and/or maintaining the components.

SUMMARY OF THE INVENTION

Therefore, an aim of the present invention is to simplify and reduce the time for assembling an aircraft fuselage, and to optimize the arrangement thereof in order to gain free space volume mainly in the triangle zone and facilitate the maintenance and repair operations relating thereto.

Another aim of the invention is to reduce the number of references for pieces necessary for assembling a fuselage and to reduce the associated labor costs for the assembly thereof and possible repair and maintenance.

To this end, the invention proposes a fuselage fitted out in an optimized manner and including a multifunctional substructure making it possible to incorporate the ducts of an air distribution system with structural and/or functional components.

More particularly, the invention proposes an aircraft fuselage including a fuselage skin, cross-members supporting a floor of the aircraft, characterized in that the fuselage includes a multifunctional substructure fixed to at least one of the cross-members in a lowered part of the cross-member and in that the multifunctional substructure comprises:

at least one duct of an air distribution system having a substantially rectangular section at the location of the at least one cross-member and having lateral walls of the duct that are substantially vertical;

a seat fixing track or a stiffener fixed on a first lateral wall of the duct of the multifunctional substructure, and;

a seat fixing track or a stiffener fixed on a second lateral wall, opposite the first lateral wall, of the duct of the multifunctional substructure.

Indeed, it is possible to maintain equal performance for flow of the fluids (same pressure drop and same flow rate) when changing from a circular section to a slightly greater equivalent section of rectangular type. Thus, it is possible to substitute the circular section conventional pipe with the substantially rectangular section duct according to the invention and distribute air through the aircraft.

The substantially rectangular section duct is assembled on each longitudinal edge with a seat fixing track and a floor support stiffening profile. Alternatively, the duct can be assembled on each longitudinal edge with seat fixing tracks or with floor support stiffening profiles.

The assembly of the substantially rectangular section duct with other structural and/or functional components allows for obtaining the multifunctional substructure allowing the simultaneous assembly of the stiffeners, of the seat tracks and of pipes of the air distribution system. Moreover, the multifunctional substructure is arranged between the cross-members and the floor allowing access to the air distribution ducts from the passenger cabin, and the repair or maintenance thereof without needing to access the inside of the triangle zone.

The fuselage of the invention can also include all or some of the following features considered separately or in any technically operable combination.

The floor covers all or some of the multifunctional substructure, the floor bearing on the seat fixing track(s) and/or on the stiffening profile(s).

An upper face of the lowered part of the cross-member is located at a height DH, under a level defined by non-lowered parts of the cross-member, which is suitable for receiving the multifunctional substructure incorporating the duct taking into account a height of the substructure, a section surface of which meets requirements of the air distribution system.

The duct has a height that varies according to the longitudinal position in the fuselage, and wherein the lowered part of the cross-members is common to several beams in order to fit the greatest height of the duct under a given length of the duct.

The multifunctional substructure comprises at least one seat fixing track and in which multifunctional substructure the lateral wall of the duct to which the track is fixed includes a longitudinal extension mid-wing. The mid-wing allows the seat fixing track to be fixed to the wall of the duct.

The multifunctional substructure further includes at least one longitudinal stiffener fixed to an upper face of the duct.

The multifunctional substructure has a width substantially equal to a desired distance between the position of the stiffening profile, for supporting an external edge of a floor panel along the fuselage skin, and a first seat fixing track, starting from the fuselage skin in the direction of a longitudinal axis of the fuselage.

The duct incorporates, in a wall of the duct, semi-finished products having electrical functions and/or electrical conductors.

The duct is produced from resin-impregnated electrically insulating fibers.

The seat fixing track and/or the stiffening profile are produced from composite materials and/or from metal alloy.

The multifunctional substructure is preassembled by a pultrusion and/or bonding and/or overmolding technique.

The invention also relates to a method for assembling a fuselage including the use of a preassembled multifunctional substructure. In an implementation mode, the multifunctional substructure is assembled above the cross-members before placing floor panels covering the substructure.

The invention also relates to an aircraft including at least one section of a fuselage of the invention.

BRIEF DESCRIPTION OF THE DRAWINGS

The invention is described with reference to the following figures. These are only presented in an indicative and nonlimiting manner with respect to the invention. The figures depict:

FIG. 3: a sectional schematic view of the multifunctional substructure assembled between the passenger floor and the cross-members.

FIGS. 4a and 4b: a schematic isometric view of the components of the multifunctional substructure; with FIG. 4a showing an exploded view, and FIG. 4b showing an assembled view.

DETAILED DESCRIPTION OF THE PREFERRED EMBODIMENTS

For the rest of the description, a longitudinal axis X is defined as the main axis of a fuselage, generally the longitudinal axis of an airplane in flight. Likewise, a transverse axis Y is defined perpendicular to the longitudinal axis, in practice parallel to the plane of the floor of the airplane cabin. Finally, a vertical axis Z completes the reference system.

Figure 1:
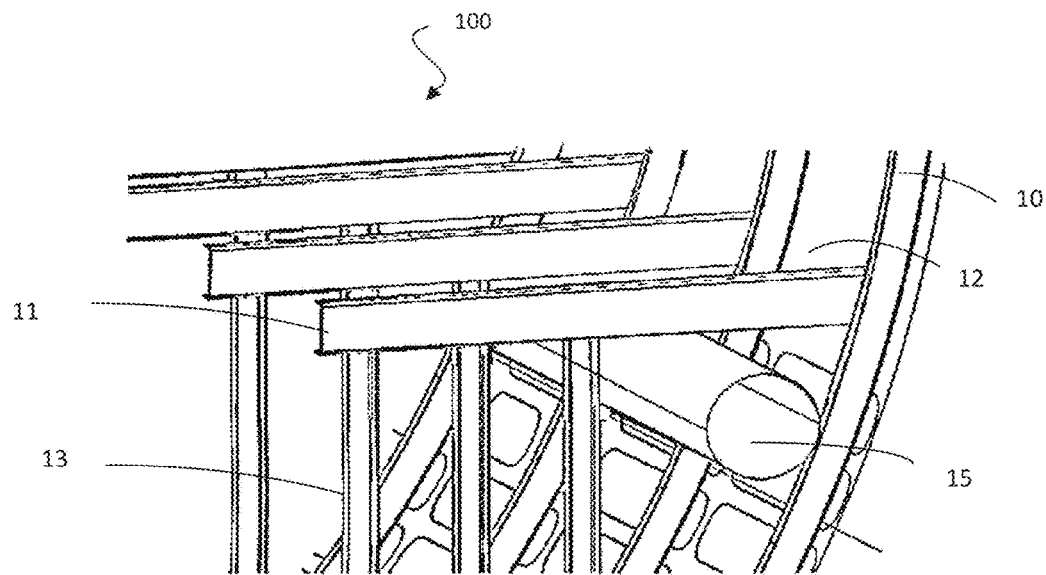
FIG. 1: a partial view of the fuselage as an isometric view including a duct of an air distribution system according to conventional mounting under the cross-members in the triangle zone.
Figure 2:
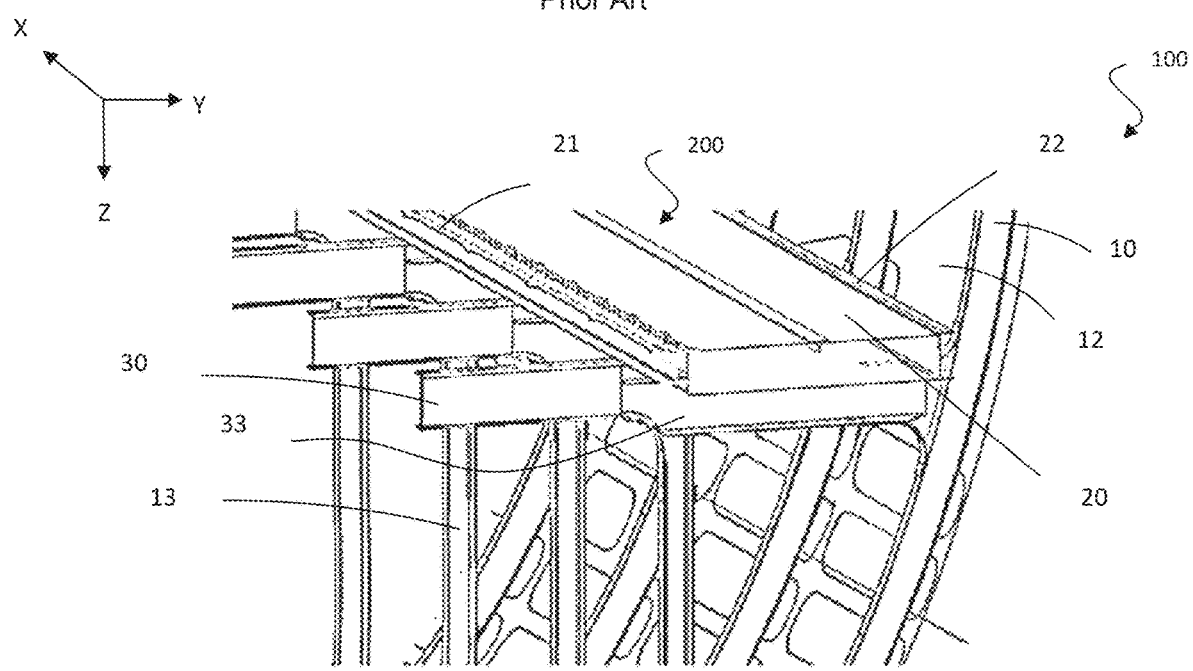
FIG. 2: a partial view of the fuselage as an isometric view including a multifunctional substructure according to the invention.

FIG. 2 shows an isometric view of a fuselage section part according to the invention wherein only the main elements of the structures are shown in a simplified form for clarity of the illustration. The figure depicts a fuselage 100 comprising frames 10, a fuselage skin 12, strengthening rods 13 supporting cross-members 30 and bearing on a lower part of the frame of the fuselage (zone not visible in the drawing).

The fuselage 100 includes a multifunctional substructure 200 incorporating a duct 20 of an air distribution system of rectangular section. The duct 20 includes, on an internal lateral wall, a track 21 used for fixing the structure of passenger seats and, on an external lateral wall, a stiffening profile 22 used to support floor panels 40. The multifunctional substructure 200 is positioned above the cross-members 30, more particularly in a lowered part 33 of a height DH located at one end of the cross-members linked to the frame of the fuselage 100, in particular above the triangle zone between the rod 13 and the frames 10.

The lowering of the cross-member 30 in the lowered part 33 mainly relates to a lower surface of the cross-member in order to allow a desired height of the duct 20. In the embodiment shown in FIG. 2, an upper surface of the cross-member is also lowered in order to keep a substantially constant section of the cross-member with respect to the non-lowered part.

It should be observed that the width of the rectangular section duct 20 is determined substantially by the distance separating the last track for passenger seats of the cabin on the side of a fuselage wall in question and an outer lateral edge of the floor of the cabin, also on the side of the fuselage wall in question. This width of the duct therefore determines the height of the duct in order to obtain the necessary section of the duct in order to provide a desired flow rate and, consequently, the value DH of the lowering 33. It should be noted that the section of the duct 20 is generally not constant depending on the position in the axis X of the fuselage of a same airplane and that, therefore, the height of the duct can vary from one frame to another as well as possibly the DH value.

The invention therefore proposes a new arrangement of the ducts of an air distribution system within the structure of the fuselage of an aircraft. This new arrangement is possible due to producing the duct 20 with a rectangular section allowing it to incorporate structural functions for supporting the floor and the seats. The requirement for additional supports is eliminated or reduced with regard to fixing the duct 20 thus facilitating the installation thereof from above the cross-members, before placing the floor panels.

However, it is possible to vary the shape and section of the duct in order to allow it to fit the various space volumes available along the fuselage in the direction of the axis X. The duct 20 can have any shape allowing the flow rate of the fluids of an air distribution system as desired and the ability to incorporate structural and/or functional elements on the lateral walls thereof, such as a stiffening profile and/or a seat fixing track.

The time to install the new rectangular section duct 20 is therefore significantly reduced and makes it possible to free up volumes of free space in the triangle zone of the fuselage. Moreover, the assembly of the fuselage is optimized, since the use of a multifunctional substructure 200 according to the invention makes it possible to assemble, with a single piece, the air distribution ducts and structural and/or functional components such as the seat tracks and the stiffening profiles.

FIG. 3 schematically depicts details of the multifunctional substructure 200 between the passenger floor 40 and the cross-members 30. The passenger floor is placed such that the forces of the floor are taken over onto the seat fixing track 21 and onto the stiffening profile 22, both incorporated on each of the lateral walls of the duct 20, respectively. To this end, the multifunctional substructure 200 is positioned on the lowered part 33 formed in the ends of the cross-members 30, in the illustrated example, in the ends linked to the frames 10 of the fuselage. This lowered part 33 present in the cross-member 30 makes it possible to obtain the desired section of the duct and the incorporation of the seat fixing track 21 and of the stiffening profile 22 making it possible to transfer the forces from the passenger floor to the cross-members 30 via the seat fixing track 21 and via the stiffening profile 22 providing the duct 20 with a certain required structural stiffness.

The width of the lowered part 33 is such that it allows at least the width-wise placement of the multifunctional substructure 200, the latter having a width corresponding to the distance between the stiffening profile joining the frame 10 and the placement of the first seat fixing track starting from the frame 10 of the fuselage toward the center of the cabin in the transverse axis Y.

The multifunctional substructure 200 can optionally incorporate one or more stiffening profiles such as the T-shaped profile 50 of the exemplary embodiment shown in FIGS. 2 and 3 on an upper face of the duct 20, at the interface between the duct 20 and the passenger floor 40 making it possible to provide a smaller bearing area of the possible forces transmitted by the floor to the duct, and to stabilize the shape of the wall of the duct.

FIGS. 4a and 4b show an exploded view of the duct in FIG. 4a, and a view of the assembled multifunctional substructure 200 in FIG. 4b. The duct 20 has a rectangular section configured to transport the air fluids.

An area of the section of the duct corresponds at least to an equivalent area of a circular section traditional duct with respect to which it must have the same aeraulic performances, i.e., providing equal performance of air flow rate between the ducts. A section of approximately 250 cm$^2$ is frequently used in ducts 20, but in practice, depending on the aircraft and depending on the location in the aircraft, the area of the section can be substantially different.

The shape of the rectangular section duct 20 makes it possible to easily incorporate structural elements on the surface thereof like the seat fixing track 21 and the stiffening profile 22. For example, the lateral wall of the duct 20 incorporating, on the surface thereof, the seat fixing track comprises a lateral mid-wing 23 allowing the anchoring of the seat fixing track, the contour of which is today standardized. Moreover, the lateral wall incorporating the stiffening profile advantageously has a simple planar surface making it possible to fix a face of a wing of a stiffening profile shaped as an I, as a U or as an H by bonding.

Figure 5:
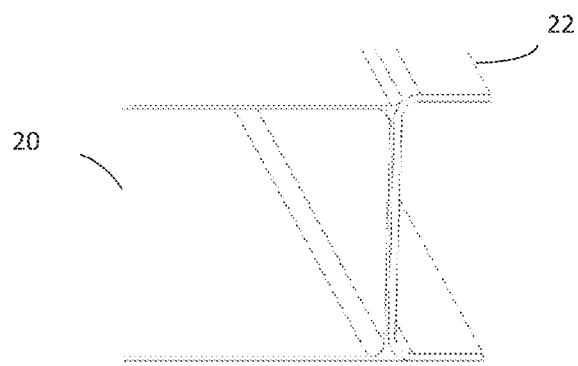
FIG. 5: a schematic isometric view of the multifunctional substructure including detail of the height of the duct and stiffening profile.

The height of the duct 20 is chosen such as to provide a section allowing a desired flow rate of the air fluids and to allow the floor to be placed on the stiffening profile of the multifunctional substructure 200. The height of the duct 20 will therefore be slightly less than that of the stiffener 22 incorporated on one of the lateral walls of the duct. FIG. 5 illustrates the slight difference in height of the duct 20 and of the stiffening profile 22 incorporated into the duct such that the floor rests on the stiffener and not on the upper surface of the duct 20.

The multifunctional substructure 200 is manufactured as a preassembled substructure incorporating a rectangular section duct 20, the seat fixing track 21 and the stiffening profile 22. It is also possible to incorporate, into the duct 20, a seat fixing track 21 on each side or to incorporate a stiffening profile 22 on each side. Moreover, the section of the duct 20 which is shown in the illustrations as constant is not necessarily constant.

Figure 6:
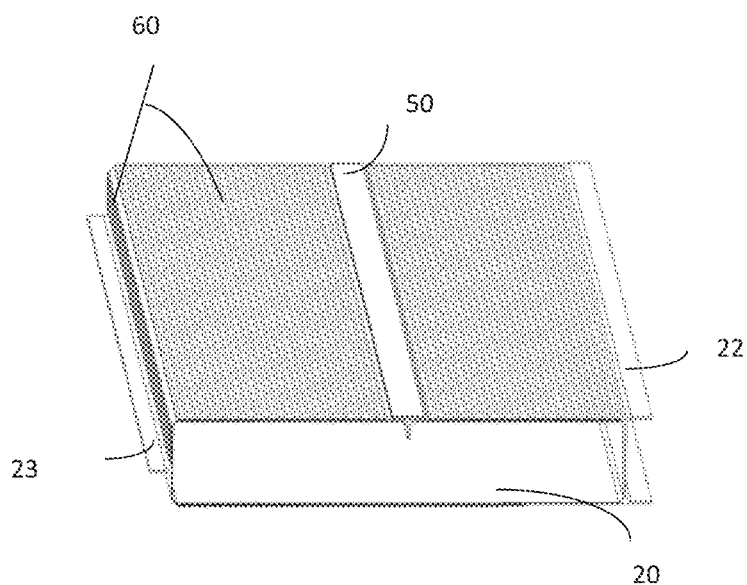
FIG. 6: a schematic isometric view of the rectangular duct section incorporating, on the surface thereof, semi-finished products.

In an embodiment, the duct 20 can incorporate other structural and/or functional elements depending on the requirements of the aircraft. For example, it is possible to incorporate semi-finished products having electrical functions on the surface or the core of the duct 20. This embodiment is illustrated by FIG. 6 depicting a perspective view of a rectangular section duct 20 incorporating, on the surface thereof, semi-finished products 60 having electrical conductivity functions and a stiffening profile 22.

The duct 20 is, for example, mainly produced from resin-impregnated glass fibers, the duct having a small thickness making it possible to obtain a light duct with complex shapes in order to fit the various spaces available along the fuselage, and the curves imposed by the shape of the fuselage or a path to be followed under the floor of the cabin. The duct 20 will therefore have, as far as necessary, a shape other than cylindrical depending on the specific needs for installation in a determined space.

The seat fixing track 21 and the stiffening profile 22 are generally produced from composite material (thermosetting or thermoplastic) or from metal such as an aluminum alloy.

The duct 20 associated with the seat fixing track(s) 21 and/or the stiffening profile(s) 22 forms the multifunctional substructure 200 which can be manufactured due to pultrusion technology. Pultrusion is a method implemented in order to continuously produce tubes or profiles made from composite materials. When implementing this method, fibers (mats or fabrics in strips) packaged in a coil are successively impregnated with resin and shaped as desired by passing through temperature and pressure regulated dies.

The multifunctional substructure 200 according to the invention can also be manufactured due to an automated method combining manufacture and assembly in a continuous manner. Bonding or overmolding technology can thus be used to assemble the air distribution duct 20, the seat fixing track 21 and the stiffening profile 22.

Several assembly alternatives can be envisaged according to the invention. For example:

In a first step, manufacturing the seat fixing track(s) 21 and the stiffening profile(s) 22 in a conventional manner (extrusion, machining, etc.) from metal alloy. Then, in a second step, using the pultrusion method in order to produce the duct by inserting the seat fixing track and the profiles into the die such as to have a close connection between the three elements, i.e., between the duct, a seat fixing track and a stiffening profile or between the duct and two seat fixing tracks or two stiffening profiles. When required, also incorporating the electrical conductivity semi-finished products during the pultrusion method.

In a first step, manufacturing the seat track(s) and/or the stiffening profile(s). The tracks or the stiffeners can be produced from composite material (RTM injection, pultrusion, braiding, etc.) and/or from metal alloy. Then, in a second step, using the pultrusion method in order to produce the duct by inserting the seat fixing track and the profile into the die such as to have a close connection between the three elements, or inserting a duct and two seat fixing tracks or two stiffening profiles. Where required, also incorporating the electrical conductivity semi-finished products during the pultrusion method.

The duct 20 can of course incorporate other structural and/or functional elements such as the stiffener 50, local strengthening pieces, air bleed ports, tube section connecting pieces for transporting the cabin air, etc.

The resulting multifunctional substructure can be incorporated into an aircraft fuselage 100 over all or part of the length of the fuselage.

The proposed fuselage has many advantages compared to the fuselages currently on the market, for example:

Reducing the time for assembling the structure of the fuselage.

Reducing the time for installing systems such as the air distribution system and the low-intensity electrical system.

Replacing the circular section conventional ducts of an air distribution system with a rectangular section duct, while retaining an air flow kept at equal performance between the ducts.

Reducing the number of individual pieces for assembling the fuselage, particularly changing from an assembly with at least three components to an assembly with a single substructure preassembled off-line.

Removal of interfaces between the structure and the substituted elements, for example supports for the air distribution system, electrical cables, etc.

Reducing the costs of assembling the structure of the fuselage.

Making new volumes of space available (for the assignment of other systems), particularly in the triangle zone of the fuselage.

Easier access for carrying out repair and maintenance work to the systems still present in the triangle zone of the fuselage, or under the floor generally.

Positioning the ducts of an air distribution system in the area adjoining the cabin and access for the repair and maintenance operation thereof from the cabin after removal of a floor panel (ease of access).

Automation of operations for manufacturing and assembling subcomponents due to manufacturing the multifunctional substructure via pultrusion.

The invention can have other embodiments. For example, the arrangement of the multifunctional substructure applied independently of the use of the strengthening rods for the floor. The multifunctional substructure can be arranged in a part other than in the ends of the cross-members, for example between two seat fixing tracks, the second track assembled like the first and replacing the stiffening profile 22.

In another embodiment, the duct which advantageously has a rectangular section when the section thereof is considered at a cross-member has variations in shapes and/or sections between two cross-members. In particular, such shape and/or section variations correspond to air distribution opening locations along the duct or even to mounting requirements in order to avoid interference with structures or other systems.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuselage of an aircraft comprising:
    a fuselage skin,
    cross-members supporting a floor of the aircraft,
    a multifunctional substructure fixed to at least one of the cross-members in a lowered part of said cross-member, said multifunctional substructure comprising:
        at least one duct of an air distribution system having a substantially rectangular section at a location of said at least one cross-member and having lateral walls of said duct that are substantially vertical;
        a seat fixing track fixed on a first lateral wall of said duct of the multifunctional substructure, and;
        a further seat fixing track or a stiffener profile fixed on a second lateral wall, opposite the first lateral wall, of said duct of the multifunctional substructure,
    wherein such seat fixing tracks and stiffener profile are positioned and arranged to support floor panels, and wherein the first lateral wall of the duct to which said seat fixing track is fixed includes a longitudinal extension mid-wing, via which mid-wing the first seat fixing track is fixed to said first lateral wall of the duct.

2. The fuselage according to claim 1, wherein the floor covers at least some of the multifunctional substructure, said floor bearing on at least one of the seat fixing track or the stiffening profile.

3. The fuselage according to claim 1, wherein an upper face of the lowered part of the cross-member is located at a height, below a level defined by non-lowered parts of said cross-member, which is suitable for receiving the multifunctional substructure incorporating the duct taking into account a height of said substructure, a section surface of which meets requirements of the air distribution system.

4. The fuselage according to claim 3, wherein the duct has a height that varies according to a longitudinal position in the fuselage, and wherein the lowered part of the at least one cross-member is common to several cross-members in order to fit the largest height of said duct under a given length of said duct.

5. The fuselage according to claim 1, wherein the multifunctional substructure further includes at least one longitudinal stiffener fixed to or being incorporated in an upper face of the duct.

6. The fuselage according to claim 1, wherein the multifunctional substructure has a width substantially equal to a desired distance between a position of the stiffening profile fixed on the second lateral wall, for supporting an external edge of a floor panel along the fuselage skin, and a first seat fixing track, starting from said fuselage skin in a direction towards a longitudinal axis of the fuselage.

7. The fuselage according to claim 1, wherein the duct incorporates, in a wall of said duct, semi-finished products having at least one of electrical functions or electrical conductors.

8. The fuselage according to claim 1, wherein the duct is produced from resin-impregnated electrically insulating fibers.

9. The fuselage according to claim 1, wherein at least one of the seat fixing track or the stiffening profile are produced from at least one of composite materials or a metal alloy.

10. The fuselage according to claim 1, wherein the multifunctional substructure is preassembled by at least one of a pultrusion, a bonding or an overmolding technique.

11. A method for assembling a fuselage of an aircraft comprising:
a fuselage skin,
cross-members supporting a floor of the aircraft,
a multifunctional substructure fixed to at least one of the cross-members in a lowered part of said cross-member, said multifunctional substructure comprising:
at least one duct of an air distribution system having a substantially rectangular section at a location of said at least one cross-member and having lateral walls of said duct that are substantially vertical;
a seat fixing track fixed on a first lateral wall of said duct of the multifunctional substructure, and;
a further seat fixing track or a stiffener profile fixed on a second lateral wall, opposite the first lateral wall, of said duct of the multifunctional substructure,
wherein such seat fixing tracks and stiffener profile are positioned and arranged to support floor panels, the method comprising the step of:
forming the duct of the air distribution system with the multifunctional substructure, and wherein the first lateral wall of the duct to which said seat fixing track is fixed includes a longitudinal extension mid-wing, via which mid-wing the seat fixing track is fixed to said first lateral wall of the duct.

12. The method for assembling a fuselage according to claim 11, further comprising the step of assembling the multifunctional substructure on the cross-members before placing floor panels covering said substructure.

13. An aircraft including at least one section of a fuselage comprising:
a fuselage skin,
cross-members supporting a floor of the aircraft,
a multifunctional substructure fixed to at least one of the cross-members in a lowered part of said cross-member, said multifunctional substructure comprising:
at least one duct of an air distribution system having a substantially rectangular section at a location of said at least one cross-member and having lateral walls of said duct that are substantially vertical;
a seat fixing track fixed on a first lateral wall of said duct of the multifunctional substructure, and;
a further seat fixing track or a stiffener profile fixed on a second lateral wall, opposite the first lateral wall, of said duct of the multifunctional substructure,
wherein such seat fixing tracks and stiffener profile are positioned and arranged to support floor panels, and wherein the first lateral wall of the duct to which said seat fixing track is fixed includes a longitudinal extension mid-wing, via which mid-wing the seat fixing track is fixed to said first lateral wall of the duct.

* * * * *